United States Patent [19]

Osujyo et al.

[11] 4,085,806
[45] Apr. 25, 1978

[54] HYDRAULIC CONTROL SYSTEM FOR TRACTOR

[75] Inventors: Masahide Osujyo; Isamu Yamanishi; Akio Inamori; Kaoru Fujikawa; Noboru Wakabayashi; Seiichi Ikegami; Makoto Okada; Morimitsu Katayama, all of Sakai, Japan

[73] Assignee: Kubota Tekko Kabushiki Kaisha, Osaka, Japan

[21] Appl. No.: 757,010

[22] Filed: Jan. 5, 1977

Related U.S. Application Data

[63] Continuation of Ser. No. 555,296, Mar. 4, 1975, abandoned.

[51] Int. Cl.² .......................................... A01B 63/112
[52] U.S. Cl. ............................................. 172/9; 172/7
[58] Field of Search ............................ 172/7, 8, 9, 10

[56] References Cited

U.S. PATENT DOCUMENTS

| 3,235,010 | 2/1966 | North | 172/7 |
| 3,331,447 | 7/1967 | Simak | 172/9 |
| 3,396,803 | 8/1968 | Corni | 172/7 |
| 3,888,315 | 6/1975 | Elfes et al. | 172/7 |

FOREIGN PATENT DOCUMENTS

| A74,960 | 1/1961 | France | 172/9 |

Primary Examiner—Richard T. Stouffer
Attorney, Agent, or Firm—Armstrong, Nikaido, Marmelstein & Kubovcik

[57] ABSTRACT

Hydraulic control system including a bypass provided in an intermediate portion of an oil passage extending from a position control valve to a hydraulic actuator for raising and lowering a working implement. A draft control valve disposed in the bypass controls the pressure of oil flowing into the bypass, in response to the displacement of a member for sensing the draft force of the working implement.

4 Claims, 19 Drawing Figures

Fig. 8(III).

HYDRAULIC CONTROL SYSTEM FOR TRACTOR

This is a continuation, of application Ser. No. 555,296, filed Mar. 4, 1975, now abandoned

BACKGROUND OF THE INVENTION

This invention relates to hydraulic control systems for tractors.

As is well known, tractors include position control means and draft control means, either one of which is adapted to be operated in accordance with the type of the working implement mounted on the tractor. The position control means serves to maintain the implement at a constant working level in spite of differences in soil conditions, whilst the draft control means gives a constant draft force, permitting the implement to work at a constant depth in the earth even when the earth geometry is irregular in the same type of soil, so as to maintain draft resistance at a constant level despite the irregularities in the soil surface. Thus the draft control means affords a well-controlled draft force to the tractor to enable the working implement to operate without stalling of the engine and free of like troubles even in the presence of obstacles such as stones.

Accordingly, the position control means is useful to working implements which operate out of engagement with the earth or which encounter low draft resistance, such as cultivators, fertilizer applicators, seeders, potato planters, etc. On the other hand, the draft control means is advantageous to plows or like implements which require a high draft power.

However, the foregoing characteristics of the draft control means are disadvantageous where accurate agricultural operation is essential. In the presence of stones, stubs or like obstacles or differences in the consistency of soil, the tractor may possibly skip thereover, leaving the soil partially uncultivated, or in extreme cases, the working implement will undergo a pitching motion to form an undulating soil surface, producing an adverse effect on the growth of plant. This is attributable to the inherent construction of the control valve in the hydraulic system for raising and lowering the working implement as will be described below with reference to FIG. 1.

Figure 1:
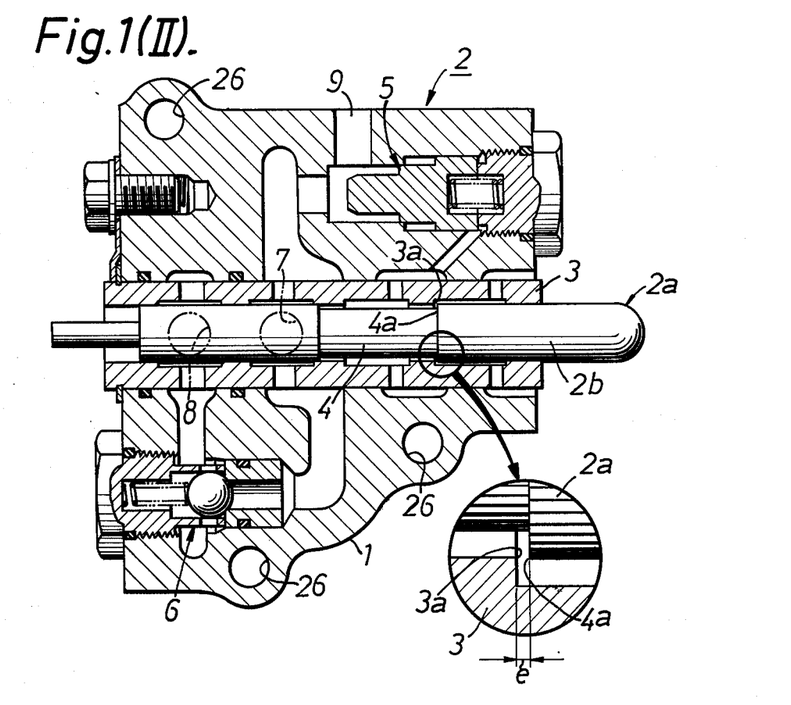

FIG. 1 shows a valve case 1 and a control valve 2 including a plunger 2a fitted in the valve case 1 as slidably inserted in a sleeve 3. The approximate midportion of the plunger 2a is constricted to provide a spool 4. The valve case 1 further includes a discharge valve 5, a check valve 6, a pump port 7, a cylinder port 8 and a tank port 9. Hydraulic press oil is forced out from an unillustrated hydraulic pump and is introduced into the valve case 1 through the pump port 7.

Figure 1I:
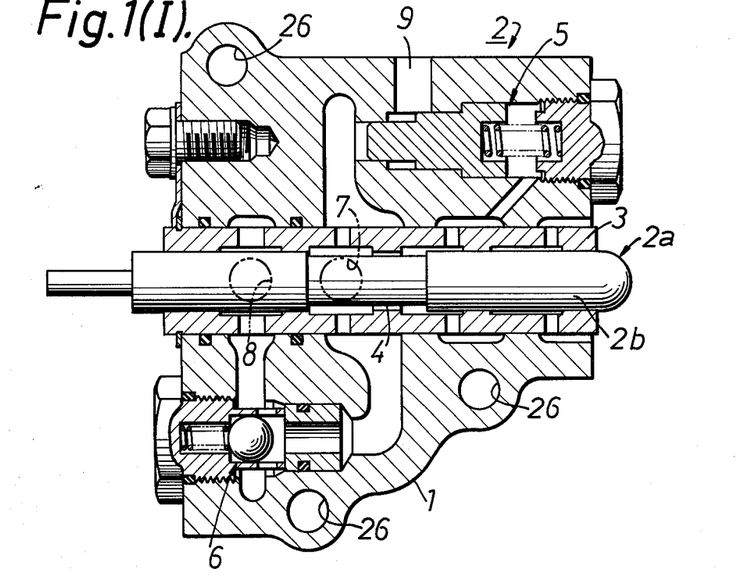

When the lift arms are to be raised, the control valve plunger 2a is brought to the position of FIG. 1 (I), with the discharge valve 5 closed and the check valve 6 opened, so that oil from the pump port 7 flows through the cylinder port 8 to exert back pressure on the piston of the hydraulic system for raising and lowering the implement. When the lift arms are to be brought to a halt, the control valve plunger 2a is positioned as illustrated in FIG. 1 (II) to open the discharge valve 5, through which the oil from the pump port 7 is returned to a tank by way of the tank port 9. More specifically stated, when the lift arms are to be raised, the plunger 2a is closed by the cooperation of a plunger portion 2b and the edge portion 3a of the sleeve 3. The oil forced into the pump port 7 flows to the discharge valve 5, applying back pressure to the discharge valve 5 to close the valve 5, whereby the return flow of oil to the tank port 9 is interrupted. Subsequently, the pressure of inflowing oil, when exceeding a given level, opens the check valve 6 and applies back pressure to the hydraulic system for the implement. When the lift arms are to be brought to a stop, the oil imparting back pressure to the discharge valve 5 is released through the clearance e between the edge 3a of the sleeve 3 and the edge 4a of the spool 4 to open the discharge valve 5. Oil therefore flows back. Since the edge portion 3a of the sleeve 3 is formed by boring, it is very difficult to accurately dimension the clearance e and, even if accurate working is possible, difficulties are encountered in making the clearance e smaller than 0.5 mm. The result achieved when the clearance e is 0.5 mm corresponds to about 5° in terms of the angle of pivotal movement of the lift arm.

Consequently, insofar as the draft control function of tractors is afforded by a control valve of the type described, the lift arms operate with a time delay in response to the displacement of a spring or the like which senses the draft force. Thus the response of the lift arm, which should ideally respond as represented by the solid line 1 in FIG. 2, actually takes place stepwise as indicated therein by the dot line II. (In FIG. 2 the displacement of spring is plotted as abscissa vs. the amount of responsive movement of the lift arms as ordinate.)

If the relationship between the displacement of spring and the amount of response of the lift arms varies stepwise, objections will result. For example, if the tractor encounters an especially heavy soil, the load on the rear wheels increases, leading to an increase in the draft torque of the rear wheels, and the tractor becomes liable to swerve off. At the same time, the draft control means functions to relieve the working implement of the load with delayed timing. As a result, the tractor body skips or bounces, giving an irregular undulating soil surface.

SUMMARY OF THE INVENTION

An object of this invention is to provide a draft control system for a tractor which, although incorporating a control valve of the foregoing type, enables the lift arms to respond to the displacement of a load sensing spring in rectilinear relationship thereto so as to assure ideal operation.

Another object of this invention is to provide a draft control system which functions by controlling the pressure of hydraulic press oil so as to operate with high sensitivity and accuracy without employing a usual complex link mechanism.

Another object of this invention is to provide a draft control system which is compact in its entirety and less prone to troubles and which is readily mountable on a tractor including position control means alone.

Another object of this invention is to provide a draft control system with which it is possible to keep the hydraulic circuit interrupted while the tractor is driven with its working implement raised as when it is driven on the road and in which hydraulic oil is prevented from elevation of temperature and early degradation.

The hydraulic control system of this invention comprises a position control valve controllable by a position control lever, a bypass extending from an intermediate portion of an oil passage extending from the position control valve to hydraulic means for raising and lowering a working implement, a draft control valve provided for the bypass and controllable by a draft control lever, a draft force sensing member incorporated into a hitch for attaching the implement to a tractor frame, and feed back means interconnecting the draft force sensing member and the draft control valve to permit the draft control valve to control, in accordance with the displacement of the sensing member, the pressure of oil flowing into the bypass.

To effect a draft control function, the position control lever is switched to its raised position, with the draft control lever switched to and retained in its operative position. With the levers thus positioned, the desired working implement is drawn by the tractor as attached thereto. During operation, the draft force detected by the sensing member is delivered through the feed back means to the draft control valve, which controls the amount of oil flowing into the bypass. Thus if draft resistance reduces, the implement lowers, whereas when draft resistance increases, the hydraulic pressure in the circuit builds up, giving an increased draft force. When the hydraulic pressure thereafter exceeds a given level, the working implement rises. In this way, the draft force is controlled only by regulating the amount of oil to be introduced into the bypass.

BRIEF DESCRIPTION OF THE DRAWINGS

FIGS. 1 (I) and (II) are sectional views showing the operation of a position control valve used in this invention;

FIGS. 8 (I), (II) and (III) are fragmentary views illustrating position control operation;

DESCRIPTION OF THE PREFERRED EMBODIMENT

Figure 3:
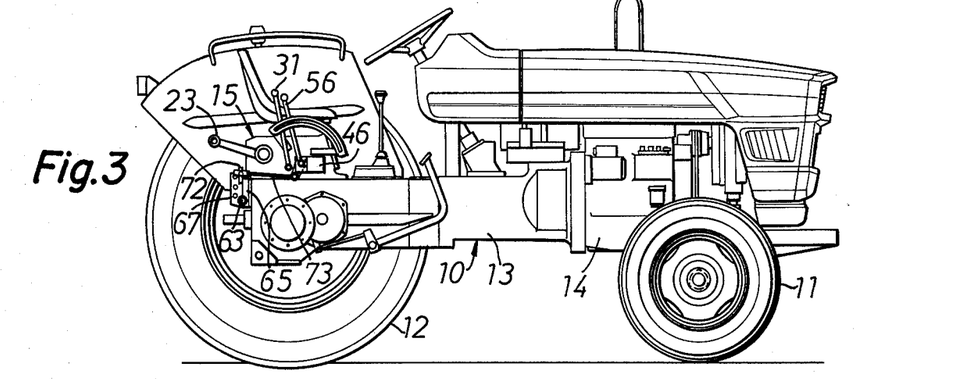
FIG. 3 is a side elevation showing the overall appearance of a tractor equipped with the system of this invention.

With reference to FIG. 3, a tractor equipped with an embodiment of this invention has a tractor body 10, front wheels 11, rear wheels 12 and a transmission case 13 serving also as the frame of tractor. An engine 14 is mounted on the front portion of the case 13.

Figure 6:
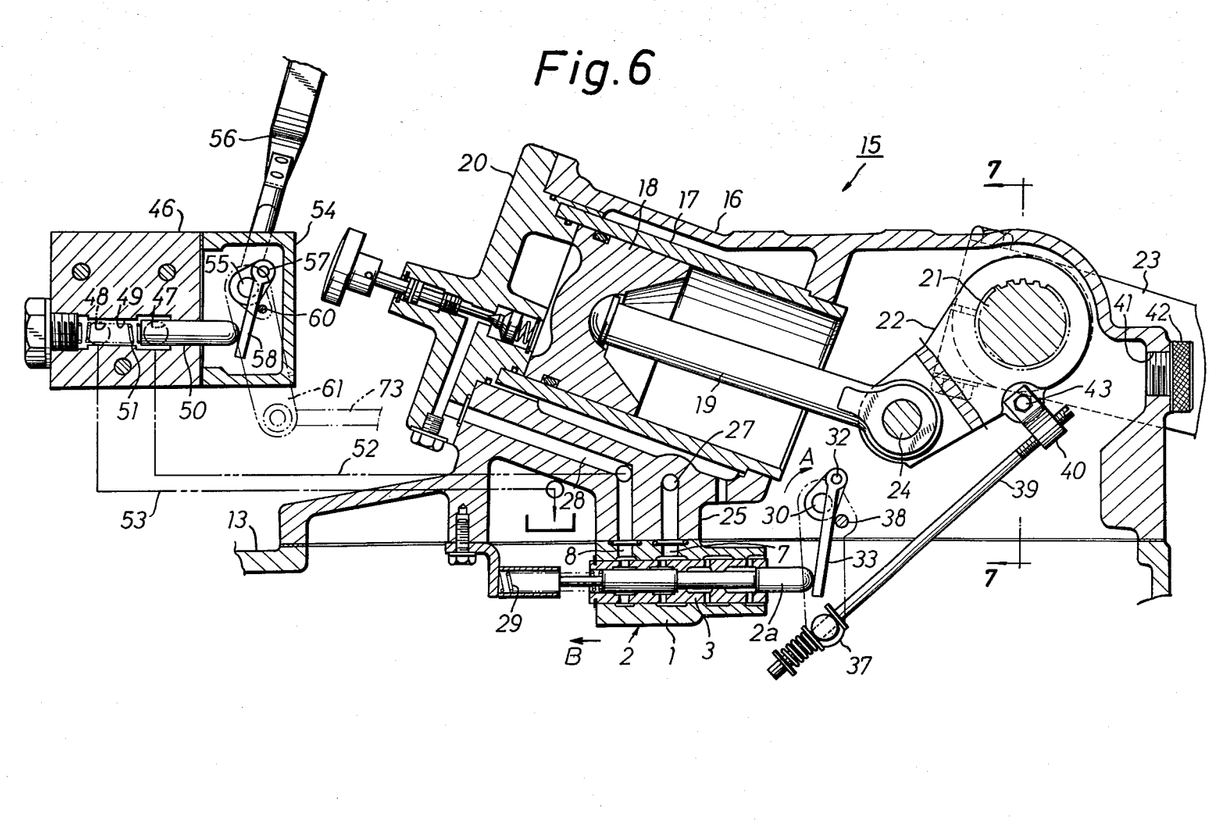
FIG. 6 is a side elevation in section showing the overall construction of the system of this invention.
Figure 7:
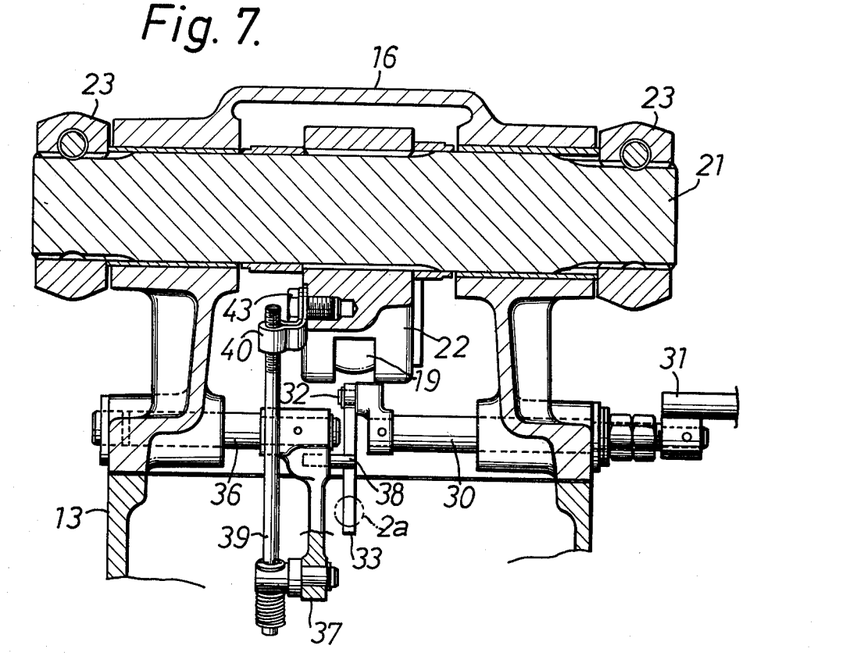
FIG. 7 is a view in section taken along the line 7—7 in FIG. 6.
Figure 8:
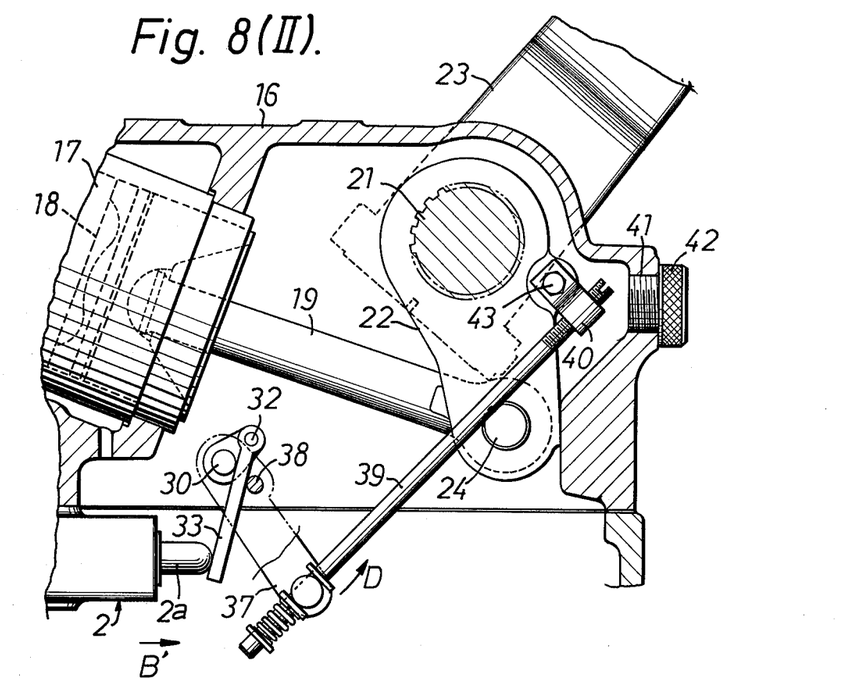
Figure 8I:
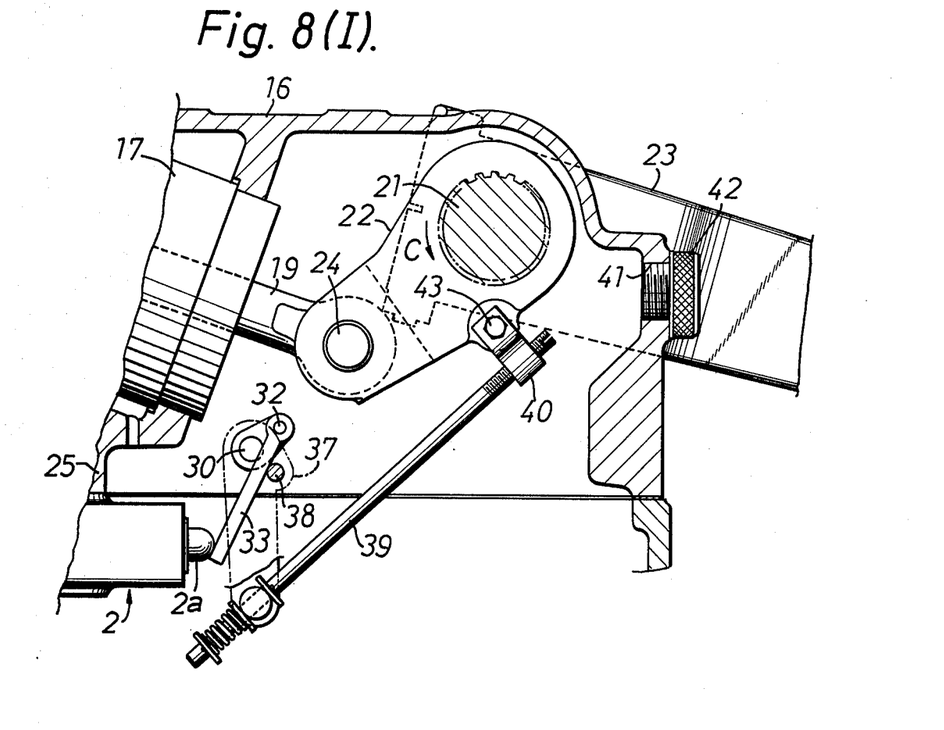

A hydraulic system 15 for raising and lowering working implements is mounted on the rear top portion of the transmission case 13. As illustrated in greater detail in FIG. 6, the hydraulic system 15 comprises a hydraulic case 16 provided over the transmission case 13, a cylinder liner 17 housed in the case 16 in a downwardly inclined position, a piston 18 slidably fitted in the cylinder liner 17 in oil-tight manner, a piston rod 19 fitted in one end of the piston 18, and a cylinder head 20 covering the front end of the case 16. A hydraulic rod 21 extends transversely of the case 16 as seen in FIG. 7 and is rotatably mounted at an upper rear portion of the case 16. A hydraulic arm 22 is fixed at its one end to the midportion of the rod 21 as by spline means. A pair of lift arms 23 and 23, fixed to the opposite ends of the rod 21, have free ends extending rearward. The piston rod 19 and hydraulic arm 22 are connected to a transverse pivot 24, such that the reciprocal motion of the hydraulic piston 18 moves the lift arms 23, 23 upward and downward about the rod 21.

The position control valve case 1, illustrated in FIGS. 1 (I) and (II), is directly attached to the lower boss portion 25 of the hydraulic case 16 for example with bolts. The bores for the bolts are indicated at 26 in FIGS. 1 (I) and (II). When the valve case 1 is mounted in place, the pump port 7 communicates with an oil passage 27 formed in the hydraulic case 16, i.e. in the boss portion 25, while the cylinder port 8 communicates with an oil passage 28 formed in the case 16 and cylinder head 20 and communicating with the cylinder. When the oil passage 27 is connected, by a pipe or suitable means, to the unillustrated hydraulic pump directly coupled to the engine, hydraulic press oil is taken in by the operation of engine and admitted to the valve case 1. Back pressure can then be given to the hydraulic piston 18 under the control of the plunger 2a. The control valve plunger 2a is always biased by a spring 29 as illustrated in FIG. 6.

Figure 4:
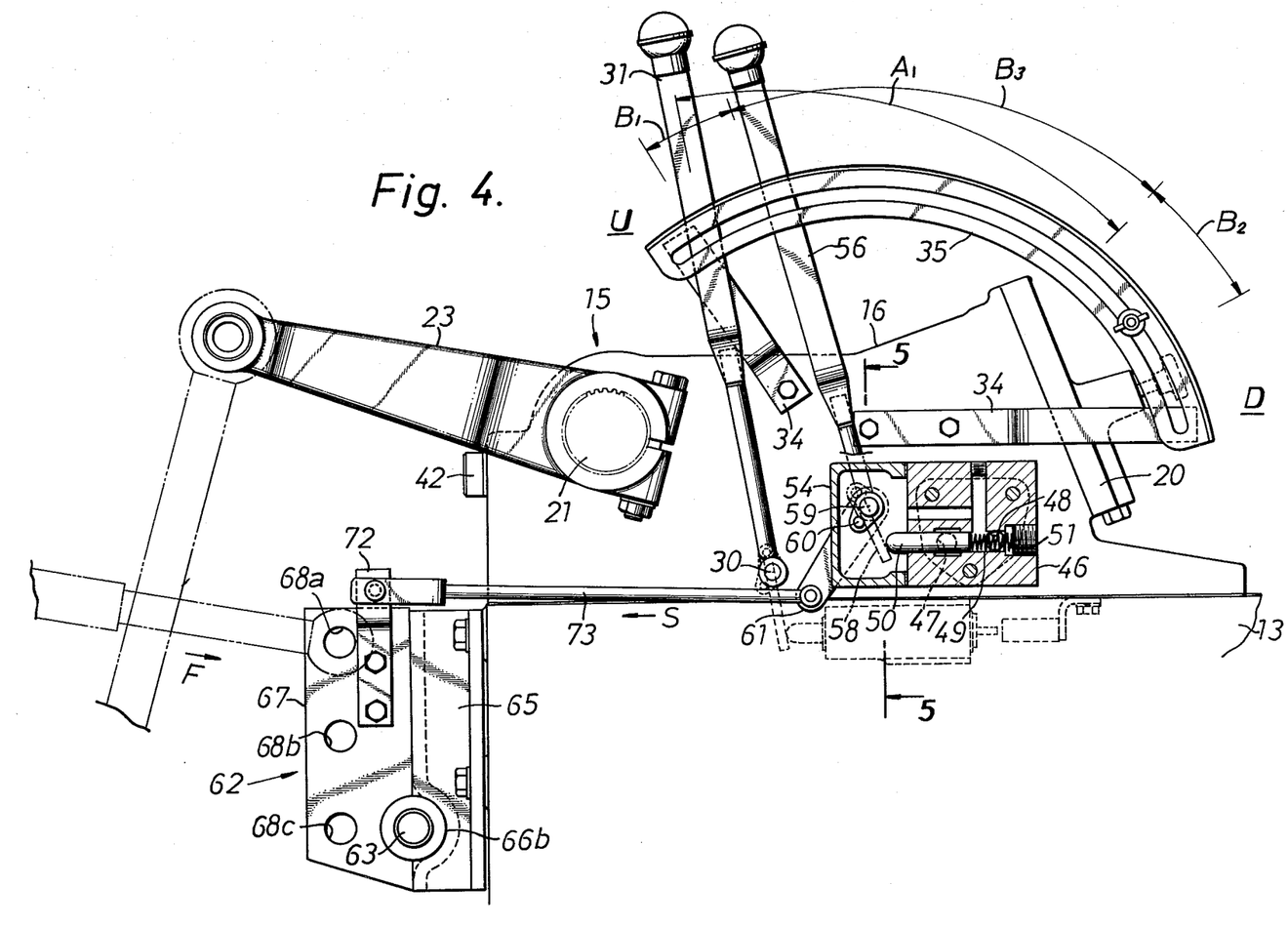
FIG. 4 is an enlarged side elevation showing the principal part of FIG. 3.

A position control rod 30 extends in parallel to the rod 21 through one side wall of the hydraulic case 16 and is supported by the wall as shown in FIG. 7. A position control lever 31 is fixed at its lower end to the outer end of the rod 30. The rod 30 is further provided at its inner end with a support pin 32 eccentrically thereof. A valve pushing lever 33 extending from the support pin 32 is substantially in contact with the valve plunger 2a. As illustrated in FIG. 4, the position control lever 31 is manually movable forward and backward about the rod 30 along an arcuate guide member 35 which is supported by stay members 34 and 34 on the side wall of the hydraulic case 16. When the lever 31 is pivotably moved toward the position U in FIG. 4, the valve 2 is so switched as to permit the lift arms 23 and 23 to be brought into an upward movement, whereas if it is turned toward the position D in FIG. 4, the lift arms 23 and 23 are downwardly movable. The position control range is indicated at A in FIG. 4. A feed back rod 36 is in alignment with the rod 30 and is supported by the hydraulic case 16 in opposing relation to the rod 30 (see FIG. 7). Extending from the inner end of the rod 36 is an interlocking arm 37. A support pin 38 inwardly extending from the arm 37 is adapted to contact the back side of the pushing lever 33. The free end of the interlocking arm 37 is connected to the hydraulic arm 22 by a feed back link 39. It is seen in FIG. 6 that a connector 40 is pivoted to a base portion of the hydraulic arm 22, and one end of the link 39 is screwed in the connector 40. The other end of the rod 39 is pivoted to the free end of the interlocking arm 37. Accordingly, the feed back link 39, when axially shifted in screw-thread engagement with the connector 40, adjusts the position of the arm 37 relative to the hydraulic arm 22. For the convenience of this adjustment, a threaded bore 41 is formed in the rear wall of the hydraulic case 16 and is normally closed with a plug 42 screwed therein. When there arises a necessity to adjust the relative position between the arm 37 and the arm 22, the plug 42 is removed, and the feed back link 39 is turned with a driver or like tool inserted through the bore 41.

Figure 15:
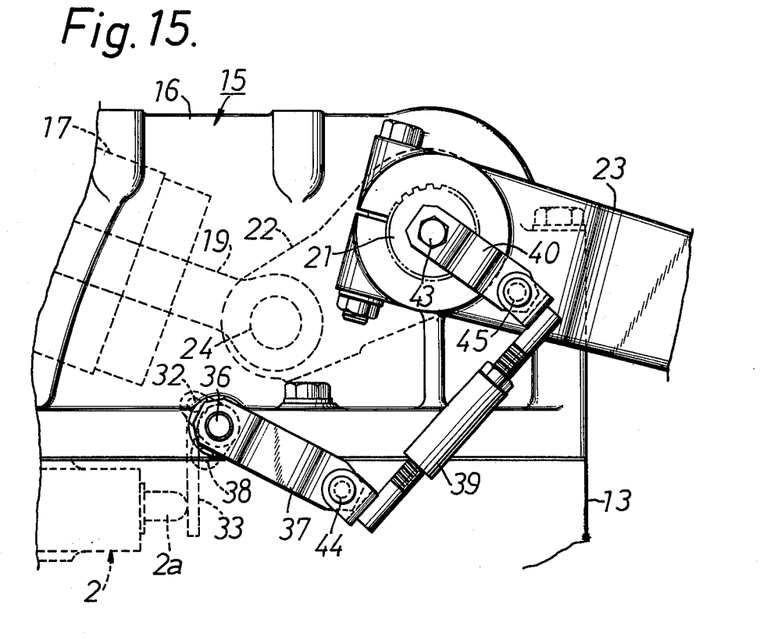
FIG. 15 is a side elevation similar to FIG. 6 and showing another embodiment.
Figure 16:
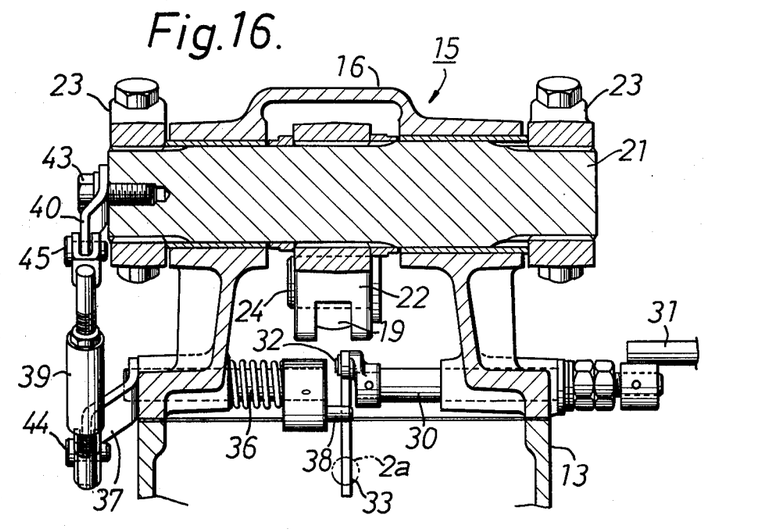
FIG. 16 is a sectional view similar to FIG. 7 but showing another embodiment.

FIGS. 15 and 16 show a feed back link 39 of the exposed turnbuckle type. The interlocking arm 37 is mounted on the outer end of the feed back rod 36. The connector 40 is pivoted to the outer end of the rod 21 by a bolt 43 or the like. The feed back link 39 interconnects the connector 40 and the arm 37 by means of pivot pins 44 and 45. In this construction, only the member which must be adjusted can be provided outside the system to assure easy adjustment, and the parts which need not be adjusted but must be protected against corrosion or rusting for trouble-free operation can be accommodated in the interior.

Figures 2, 5:
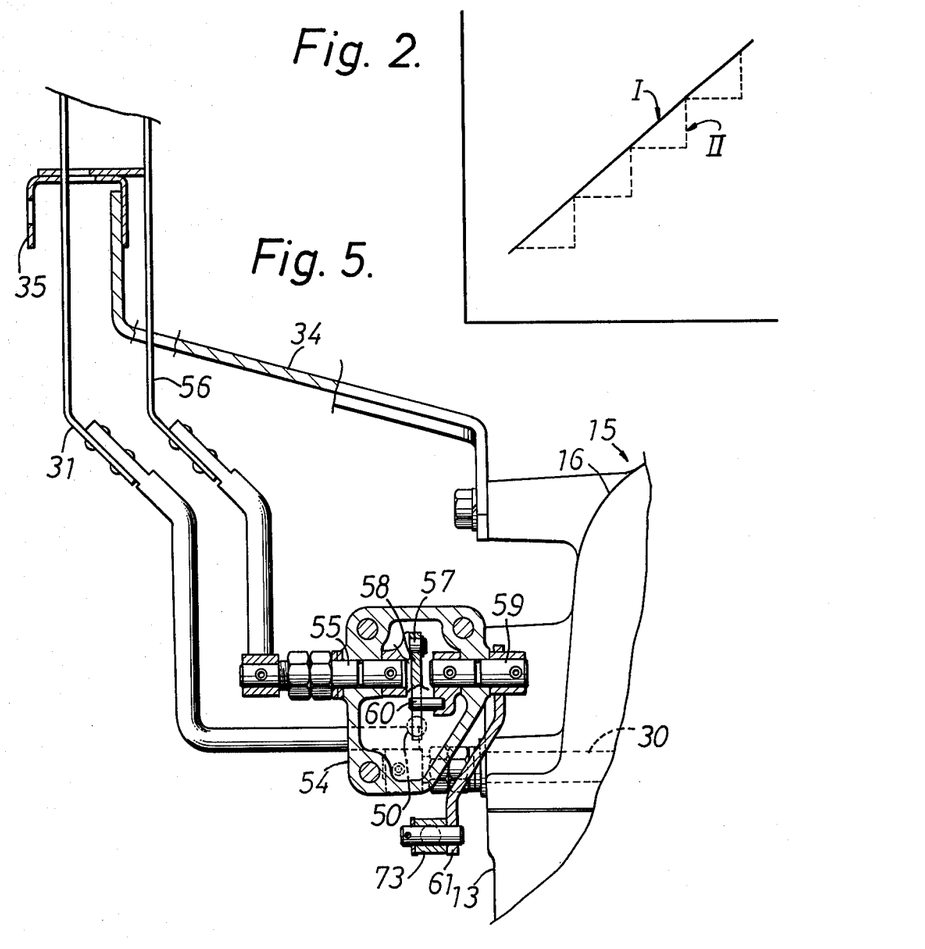
FIG. 2 is a graph showing the relationship between the displacement of a draft force sensing member and the response of lift arms in a conventional system for the evaluation of draft control effect.
FIG. 5 is a view in section taken along the line 5—5 in FIG. 4.

A draft control valve case 46 is mounted on the side wall of the hydraulic case 16 by bolts or like means. The case 46 has an oil passage 49 formed as by boring and provided with an inlet port 47 and an outlet port 48. A draft valve plunger 50 of the spool type is slidably fitted in the case 46 and extends between the inlet port 47 and the outlet port 48. The plunger 50 is spring-loaded all the time as indicated at 51. When the draft valve case 46 is mounted in position, the inlet port 47 communicates with a bypass 52 extending from an intermediate portion of the oil passage 28 on the cylinder side, while the outlet port 48 communicates with an outlet passage 53 communicating with the tank. Both the bypass 52 and outlet passage 53 are formed in the hydraulic case 16 as shown in FIG. 6. A cover 54 is mounted on the rear wall of the case 46 by bolts or like means. Rotatably supported by the cover 54 transversely thereof is a rod 55 on the outer end of which is mounted the lower end of a draft control lever 56 (see FIG. 5). The rod 55 is further provided at its inner end with a support pin 57 eccentrically thereof. A pushing lever 58 extending from the support pin 57 is in contact with the draft valve plunger 50 (see FIG. 4). As shown in FIG. 5, the draft control lever 56 is positioned inwardly of the position control lever 31 and is manually movable forward and backward along the lever guide 35. The draft control range is indicated at $B_3$ in FIG. 4. If the draft lever 56 is operated over the range of $B_1$, the lift arms are upwardly movable irrespective of draft force, while if in the floating range $B_2$, it permits the lift arms to move downward.

A draft feed back rod 59 is rotatably supported by the cover 54 as opposed to the rod 55 (see FIG. 5). The rod 59 has at its one end a pin member 60 eccentrically thereof. As shown in FIG. 4, the pin member 60 is in contact with the rear side of the pushing lever 58. The other end (namely the inner end, with respect to the tractor) of the rod 59 carries a feed back lever 61.

Figure 9:
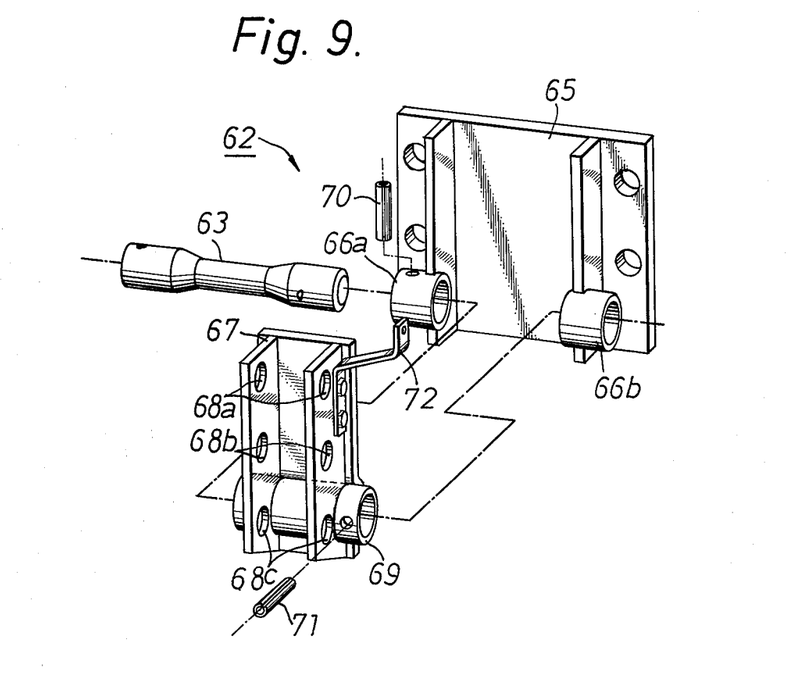
FIG. 9 is an exploded perspective view showing draft force sensing means.
Figure 10:
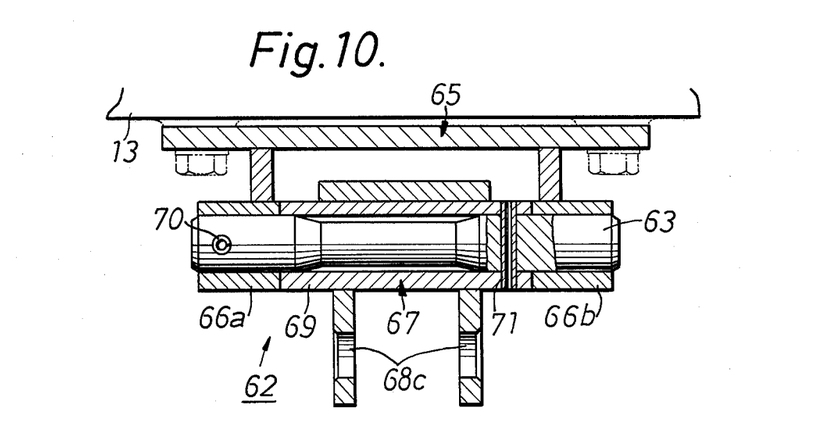
FIG. 10 is a view in section showing the same means as assembled.

The feed back lever 61 is connected, by a feed back link 73, to a draft force sensing member 63 incorporated into a hitch 62 mounted on the rear wall of the tractor frame. FIGS. 9 and 10 show draft force sensing means. With reference to these drawings, a first hitch member 65 is fixed, by bolts or the like, to the center of rear wall of the transmission case 13 serving as the tractor frame. The hitch member 65 includes a pair of cylindrical boss portions 66a and 66b at its opposite sides. A second hitch member 67, fitted in between these boss portions of the first hitch member 65, includes a pair of side walls, each having vertically arranged three bores 68a, 68b and 68c. The second member 67 further has a cylindrical boss portion 69 extending transversely of the side walls. As shown in FIG. 10, the boss portion 69 of the second hitch member 67 is fitted between and aligned with the boss portions 66a and 66b of the first hitch member 65. A connecting bar 63, having enlarged opposite ends and a constricted midportion, is inserted in the aligned boss portions 66a, 69 and 66b. One enlarged end of the connecting bar 63 is fixedly connected to the first hitch member 65 with a pin 70, and the other enlarged end of the bar 63 to the second hitch member 67 with a pin 71. A feed back connector 72 secured to the second hitch member 72 is connected by the feed back link 73 as seen in FIG. 4. The top link of a working implement such as a plow is connected, for example, to the second hitch member 67, for example, at the bores 68a. Thus, the connection means comprises the divided hitch members, namely the first and the second members 65, 67, and the bar 63 having the constricted midportion and enlarged ends connected to the first member 65 and to the second member 67 by the pin members 70, 71 respectively. Consequently, a working load, acting on the connection means as indicated by the arrow F in FIG. 4, twists the bar 63, whereby the draft force can be detected and fed to the draft control means. The draft sensing member is of course replaceable by a coiled spring or U-shaped plate spring, but use of the torsion bar as above renders the construction simple and assures easy maintenance.

With the present system described, the opposite lift arms 23 are in their lowermost position when the hydraulic piston 18 is at its top dead center. When the bar 30 in this state is turned in the direction of arrow A in FIG. 6, the pushing lever 33, while in contact with the pin member 38, follows this movement to push the control valve plunger 2a in the direction of arrow B against the spring 29, consequently opening the check valve 6 shown in FIG. 1. The hydraulic press oil from the pump is therefore forced through the cylinder port 8 into the cylinder oil passage 28. Since the draft control lever 56 is in its raised position, the valve 50 completely prevents flow of oil through the bypass 52 communicating with the oil passage 28. The oil forced into the oil passage 28 exerts back pressure on the hydraulic piston 18, thereby depressing the piston 18 in the cylinder liner. Through the piston rod 19, the piston 18 turns the arm 22 in the direction of arrow C in FIG. 8 (I). The arm 22, connected to the rod 21, consequently raises the lift arms 23 and 23. At this time, the feed back link 39, having one end pivoted to the arm 22 and the other end pivoted to the interlocking arm 37, follows the movement of the arm 22 and turns the arm 37 in the direction of arrow D in FIG. 8 (II), whereupon the pin member 38 tends to move out of contact with the back side of the pushing lever 33. However, the force of the spring 29, acting on the control valve plunger 2a all the time, holds the pushing lever 33 in contact with the pin member 38 to automatically return the control valve plunger 2a to the original position as indicated at B' in FIG. 8 (II) and to thereby bring the hydraulic piston to a halt. To raise the hydraulic piston 18 and lower the lift arms 23 and 23, the control lever 31 is manipulated so as to turn the rod 30 in the direction of arrow A' in FIG. 8 (III). This causes the control valve plunger 2a to be withdrawn in the direction of arrow B' in FIG. 8 (III) by action of the spring 29, whereby the hydraulic piston 18 is relieved of the pressure exerted thereon. Under the gravity acting on the lift arms 23, 23 and on the implement thereby supported, the lift arms 23 and 23 move downward about the arm 21, turning the arm 22 in the same direction and thereby causing the piston rod 19 to raise the piston 18. At this time, the movement of the arm 22 is delivered through the feed back link 39 to the interlocking arm 37. The pin member 38 on the arm 37 pushes the pushing lever 33, which in turn pushes the valve plunger 2a against the spring 29. In this way position control is effected.

Draft control operation will now be described. Draft resistance, when exceeding a predetermined value, twists the connecting bar 63. The torsion is delivered through the feed back connector 72, feed back link 73 and feed back lever 61 to turn the rod 59, which displaces the pin member 60, causing the pushing lever 58 to push the valve plunger 50. For draft control, the position control lever 31 is placed in its raised position, and the draft control lever 56 is retained in the draft control range $B_3$. The oil passage 28 on the cylinder side is therefore filled with oil all the time. As already described, the bypass 52 extends from the oil passage 28 and communicates with the inlet port 47 for the draft control oil passage 49, which is adapted to communicate with its outlet port 48 by the valve plunger 50 biased with the spring 51 all the time. Accordingly, the amount of oil flowing out from the oil passage 49 into the outlet passage 53 is determined by the throttling action of the valve plunger 50. When draft resistance reduces, the feed back link 73 shifts in the direction of arrow S in FIG. 4, thereby turning the lever 61 in the same direction, with the results that the pin member 60 acts to move out of contact with the back side of the pushing lever 58. This causes the spring 51 to slidingly move the control valve plunger 50 in the same direction. The oil flowing in through the bypass 52 is therefore discharged from the outlet port 48. Consequently, if the oil passage between the inlet port 47 and the outlet port 48 becomes no longer blocked by the valve plunger 50, the hydraulic force exerting back pressure on the piston 18 by way of the oil passage 28 reduces to lower the lift arms 23 and 23. Briefly, as the draft resistance reduces, the degree of the throttling action of the valve plunger 50 decreases, allowing a larger amount of oil to flow out from the cylinder oil passage 28 through the outlet port 48 and to return to the tank. As a result, the hydraulic pressure on the piston 18 reduces to lower the lift arms 23 and 23, which in turn lower the working implement. Conversely, if draft resistance increases, the resulting torsion is delivered backward to cause the valve plunger 50 to throttle oil to a greater extent, consequently building up the hydraulic pressure in the cylinder oil passage 28 as well as the hydraulic pressure on the piston 18. This pressure acts to raise the working implement, increasing the draft force. With a further increase in the throttling degree, the hydraulic pressure increases to give a greater pressure to the piston 18. The working implement therefore rises.

Because the throttling effect achieved by the draft valve plunger 50 regulates the amount of outflow of the oil forced into the cylinder oil passage 28 from the control valve 2, the hydraulic pressure on the piston 18 can be automatically controlled. As a result, the hydraulic pressure acting on the piston 18 is variable in rectilinear relationship to the displacement or torsion of the draft sensing member as illustrated in FIG. 2. Furthermore if the draft control lever 56 is lowered to a full extent in the direction D in FIG. 4, the oil passage extending from the inlet port 47 to the outlet port 48 is kept fully open by the action of the spring 51 which biases the draft valve plunger 50, whereby the throttling effect is completely eliminated. The lift arms 23 and 23 will then remain in floating state, without moving upward, even when the sensing member 63 is twisted to the greatest degree. Conversely, when the draft lever 56 is fully turned in the direction U in FIG. 4, the oil passage from the inlet port 47 to the outlet port 48 is completely blocked up, with the result that the lift arms rise under position control even in the absence of displacement of the sensing member 63.

Figure 11:
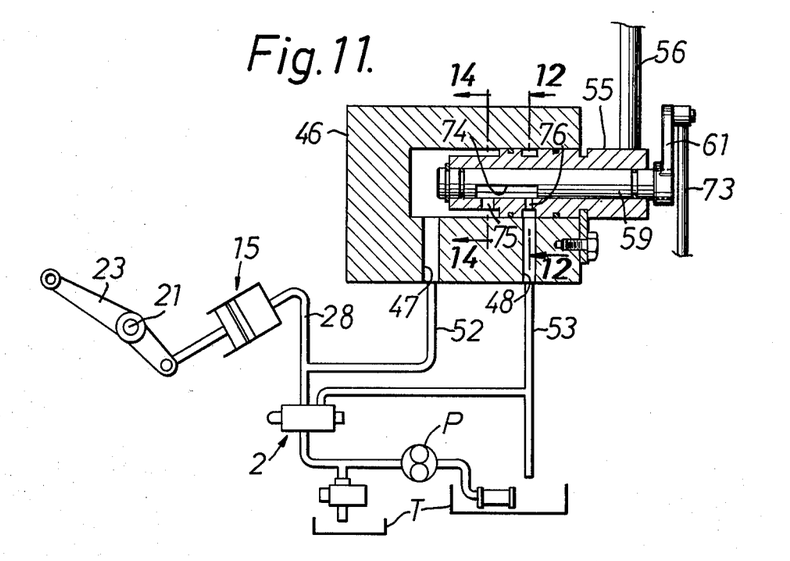
FIG. 11 is a view in section showing another embodiment of draft control system according to this invention.
Figure 12:
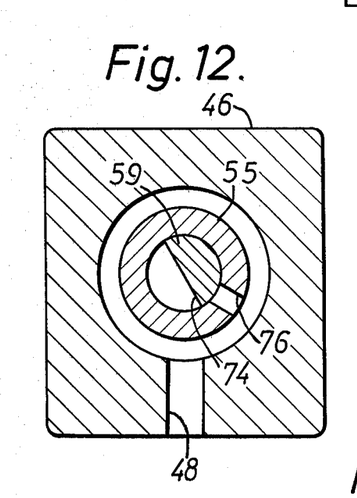
FIGS. 12 and 13 are views in section taken along the line 12—12 in FIG. 11 and illustrating the same during operation.

FIGS. 11 to 14 show another embodiment of this invention. Referring to FIG. 11, a feed back rod 59 is secured to a feed back lever 61 and inserted in a draft lever rod 55 fixedly carrying a draft control lever 56. In a suitable portion of the feed back rod 59, there is formed a cutout 74 in corresponding relation to ports 75 and 76 which are formed in the draft lever rod 55 and communicate with an inlet port 47 and an outlet port 48 respectively.

To effect position control, the draft control lever 56 is turned to the extremity of its raised position. In this state, the port 76 communicating with the outlet port 48 is closed with the peripheral surface of the feed back lever rod 59 (see FIG. 12). Consequently, even when hydraulic oil is withdrawn by a hydraulic pump P from a tank T and is then forced into a cylinder oil passage 28 by way of a control valve 2, the oil will not be returned to the tank through a bypass 52 and an outlet passage 53. This makes possible position control irrespective of the displacement of the sensing member 63.

Figure 13:
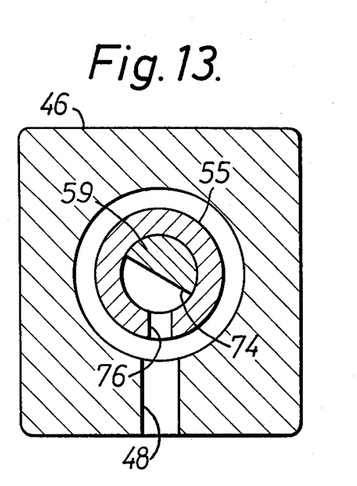
Figure 14:
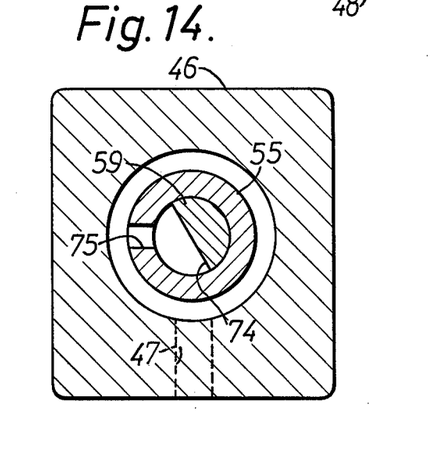
FIG. 14 is a view in section taken along the line 14—14 in FIG. 11.

For draft control, the position control lever 31 is retained in its raised position, and the oil is forced into the cylinder oil passage 28. The bypass 52 extending from an intermediate portion of the oil passage 28 is adapted to pass oil through the inlet port 47 in the draft valve case 46, so that the oil will be returned to the tank T through the port 76 as illustrated in FIG. 13. When the draft force detected is delivered through the feed back link 73 and lever 61, the rod 59 is rotated in the direction of the arrow in FIG. 13 to reduce to communication area of the port 76 by the peripheral surface of the rod 59. The lift arms 23 and 23 are thus rendered liftable in accordance with the degree of this throttling action.

The following constructions will further enhance the usefulness of the foregoing system of this invention.

The construction in which the position control valve case 1 is directly mounted on the hydraulic case 16 on the transmission case 13 and is covered with the case 16 protects the valve 2 from dust and rusting and assures perfect lubrication for trouble-free operation. This is very advantageous to agricultural tractors which are subjected to spattering water, mud and soil. Because the position and draft control levers 31 and 56 are concentrically arranged on one side of the hydraulic case 16, with the support rods 30 and 55 thereof retained by the case 16 and cover 54, various operation means can be installed in the vicinity of the hydraulic means 15 and are rendered easy to manipulate. The operation mechanisms, which are covered with the hydraulic case 16 and the like, are operable free of errors or failures, whilst if the feed back link 39 only is disposed outside the system, it is made easy to adjust for accurate operation, since it must be adjusted very frequently.

What is claimed is:

1. A hydraulic control system for a tractor, comprising hydraulic means for raising and lowering a working implement mounted on the frame of the tractor, a position control valve for controlling the operation of the hydraulic means, a first manual manipulating means, said means for manipulating the position control valve, means for operating the position control valve operable by said first manipulating means, a hitch mounted on the tractor frame to mount the working implement and having a draft force sensing member, a draft control valve, a second manual manipulating means, said means for manipulating the draft control valve, means for operating the draft control valve operable by the said second manual manipulating means, draft feed back means interconnecting the operating means and the draft force sensing member, the manual manipulating means for the position control valve and for the draft control valve being independently operable such that movement of one manipulating means cause no movement of the other manipulating means and being separately provided with, respectively, a bypass communicating with a tank and located in an intermediate portion of an oil passage extending from the position control valve to the hydraulic means for applying oil pressure to the piston of the hydraulic means, the position control valve and the draft control valve being separate from and independent of each other, the draft valve being disposed in the bypass, the draft control valve being operable to completely shut off inflow of working oil into the bypass to thereby render the system operable solely for position control when the draft control valve manual manipulating means is shifted to its raised position, the draft control valve being operable to control return flow of oil to the tank through the bypass in response to variations in draft force when the position control valve manual manipulating means is in its raised position, permitting pressure to act on the piston of the hydraulic means, so that upon a decrease in draft resistance the throttling degree of the draft control valve for the bypass decreases, increasing the return flow of oil to the tank and thereby reducing the pressure on the piston, while upon an increase in draft resistance the throttling degree increases, reducing the return flow of oil to the tank and thereby increasing the pressure on the piston.

2. A hydraulic control system as defined in claim 1, wherein the position control valve is provided internally by being mounted directly on and covered with the hydraulic case of the hydraulic means, and the draft control valve is provided externally by being mounted on an outer wall of the hydraulic case.

3. The hydraulic control system as set forth in claim 1 wherein the bypass is directly formed in the hydraulic case of the hydraulic means, and the case of the draft control valve is directly mounted on the hydraulic case.

4. The hydraulic control system as set forth in claim 1 wherein the hitch comprises separate hitch members, and a torsion bar connecting the hitch members together serves as the draft force sensing member.

* * * * *